(12) United States Patent
Baozong et al.

(10) Patent No.: US 6,752,936 B2
(45) Date of Patent: Jun. 22, 2004

(54) ELECTRICALLY CONDUCTIVE POLYMERS

(75) Inventors: Zhao Baozong, Singapore (SG); Neoh Koon Gee, Singapore (SG); Kang En Tang, Singapore (SG)

(73) Assignee: The National University of Singapore, Singapore (SG)

( * ) Notice: Subject to any disclaimer, the term of this patent is extended or adjusted under 35 U.S.C. 154(b) by 247 days.

(21) Appl. No.: 09/828,924

(22) Filed: Apr. 10, 2001

(65) Prior Publication Data

US 2001/0041485 A1 Nov. 15, 2001

(30) Foreign Application Priority Data

Apr. 11, 2000 (SG) .............................................. 20002026

(51) Int. Cl.⁷ .............................. H01B 1/12; B05D 3/00; C08J 7/04; G03C 1/00
(52) U.S. Cl. ...................... 252/511; 252/500; 252/510; 252/586; 252/589; 427/372.2; 427/520; 106/14.31; 106/14.42; 430/91; 264/349
(58) Field of Search ................................ 252/511, 510, 252/586, 589, 500, 579.33; 106/14.31, 14.42; 427/372.2, 520, 302, 322; 430/91, 627, 599, 600, 631; 264/349; 428/411.1; 359/265, 270, 273

(56) References Cited

U.S. PATENT DOCUMENTS 4,750,817 A * 6/1988 Sammells ................... 359/270
5,471,338 A * 11/1995 Yu et al. ..................... 359/273
5,989,717 A * 11/1999 Allemand et al. .......... 428/426

FOREIGN PATENT DOCUMENTS

| EP | 0 995 786 A1 | 10/1999 | |
| FR | 2563229 A | 10/1985 | |
| JP | 01-230691 | * 9/1989 | ............ C09K/9/02 |
| JP | 03-152183 | * 6/1991 | ............ C09K/9/02 |
| JP | 0610250 A | 4/1994 | |
| JP | 06-102540 | * 4/1994 | ............ G02F/1/15 |
| JP | 07-301828 | * 11/1995 | ............ G02F/1/15 |

OTHER PUBLICATIONS

Zhao et al, "Interactions between polyaniline and viologens", Synthetic Metals, 2001, 123, 263–266.*

Ng et al, "Conversion of Polyaniline from insulating to conducting state in aqueous viologen solutions", J. Phys. Chem. B. 2001, 105, 5618–5625.*

* cited by examiner

Primary Examiner—Yogendra N. Gupta
Assistant Examiner—Kallambella Vijayakumar
(74) Attorney, Agent, or Firm—Birch, Stewart, Kolasch & Birch, LLP

(57) ABSTRACT

An electrically conductive polymeric article including a polymeric material capable of exhibiting electrical conductivity;

the polymeric material being rendered electrically conductive by treatment with a viologen salt.

27 Claims, 2 Drawing Sheets

ELECTRICALLY CONDUCTIVE POLYMERS

FIELD OF THE INVENTION

The present invention relates to a method of preparing electrically conductive polymeric material by treatment with a viologen salt and to electrically conductive polymeric articles formed thereby.

DESCRIPTION OF RELATED ART

In recent years electrically conductive polymers have been widely studied because of their potential important commercial applications. Such polymers include polypyrrole and its derivatives and polyaniline and its derivatives.

The aniline family of polymers is an example of one of the most widely studied electroactive polymers because of the ease of synthesis and the unusual nature of its electrical conductivity which can be varied over a wide range. Polyaniline (PANi) in its insulating base form is readily soluble in N-methylpyrrolidinone and can be cast into films or coated on different substrates. The insulating form can be converted to the conductive form by the following methods:

(1) Treatment with protonic acids

PANi in the emeraldine (50% oxidated) base state when treated with protonic acids shows an increase in electrical conductivity. The resulting conductivity is a strong function of the pH of the equilibrating solution. For example, when aqueous HCl is used at pH greater than 4, the PANi remains as the essentially insulating non-protonated form whereas at pH~0 (i.e. with 1 M HCl), the conductivity increases by 10 orders of magnitude (J. C. Chiang and A. G. MacDiarmid, *Synth. Met.* 13, 193 (1986)). In the latter case, the imine units of the PANi are protonated to give a $N^+/N$ ratio of about 0.5. In this form of doping, there is no change in the number of electrons in the PANi chains.

The electrical conductivity of the PANi treated with protonic acids depends not only on the pH of the equilibrating solution but also on the oxidation states of the PANi. For example, PANi in the leucoemeraldine (100% reduced) state shows only a small increase in conductivity when treated with protonic acids (J. C. Chiang and A. G. MacDiarmid, *Synth. Met.* 13, 193 (1986)).

(2) Charge transfer interaction with organic electron acceptors

PANi in the emeraldine base state can undergo charge transfer interaction with organic electron acceptors such as tetrachloro-o-benzoquinone and 2,3-dichloro-5,6-dicyano-p-benzoquinone in acetonitrile (S. H. Khor, K. G. Neoh and E. T. Kang, *J. Appl. Polym. Sci.* 40, 2015 (1990)). An increase in electrical conductivity is achieved and the magnitude of the conductivity is dependent on the type of organic acceptors and acceptor concentration. The charge transfer interaction of emeraldine base with the organic electron acceptor is analogous to that of protonation by HCl, with the hydrogen atoms in the latter replaced by the partially dehalogenated halobenquinone rings. The maximum conductivity achieved is at least an order of magnitude lower than that achievable in protonic acid doping of emeraldine base.

PANi in the leucoemeraldine state undergoes oxidative doping by organic electron acceptors in acetonitrile solution which involves first the oxidation of the amine nitrogen and also the formation of the imine structure through hydrogen transfer from the amine nitrogen to the acceptor. The so-produced imine nitrogen is then in turn doped by the acceptor, as described above for PANi in the emeraldine state (E. T. Kang, K. G. Neoh, T. C. Tan, S. H. Khor, and K. L. Tan, *Macromolecules.* 23, 2918 (1990)). The maximum electrical conductivity obtained is also about an order of magnitude lower than that obtained from protonic acid doping of emeraldine.

It would be a significant advance in the art if a method of preparing an electrically conductive polyaniline material could be provided which would function irrespective of the oxidation state of the polyaniline. The polyaniline base material may be a substituted or unsubstituted polyaniline. It would be a further significant advance in the art if a method could be provided which did not involve the use of acid or organic solvents such as acetonitrile.

It is accordingly an object of the present invention to overcome, or at least alleviate, one or more of the difficulties and deficiencies related to the prior art.

SUMMARY OF THE INVENTION

Accordingly, in a first aspect of the present invention there is provided an electrically conductive polymeric article including a polymeric material capable of exhibiting electrical conductivity;

the polymeric material being rendered electrically conductive by treatment with a viologen salt.

It has surprisingly been found that the electrically conductive polymeric article according to this aspect of the present invention exhibits a high level of electrical conductivity. For example, electrically conductive polyaniline may be prepared with resistances (Rs) decreasing from approximately $10^{10}$ to approximately $10^6$ Ω/sq or below, irrespective of the oxidation state of the polyaniline material. Polyaniline material may be in the leucoemeraldine (0% oxidation state) or emeraldine (50% oxidation state) states or in any oxidation state between these two states.

Examples of polymeric materials capable of being rendered electrically conductive by treatment with a viologen include polymers derived from aromatic bases such as aniline and its derivatives and from heterocyclic bases such as pyrrole and its derivatives.

Prepared polymeric materials for inclusion in the polymeric articles of the invention include polyaniline and its derivatives and polypyrrole and its derivatives. Polyaniline and polypyrrole are particularly preferred polymeric materials.

The electrically conductive polymeric material may be formed in any suitable manner and may take any suitable shape. The polymeric may be in the form of a film, e.g. a free standing film, a film coating, e.g. a thin film coating, or a powder.

In a preferred aspect the polymeric material may be deposited or supported on a suitable substrate. The substrate may be a fabric, polymeric matrix film or other construct. A polyethylene substrate, e.g. a low density polyethylene (LDPE) substrate may be used.

The viologen salt utilised to dope the polymeric material may be of any suitable type. Viologen salts such as a dihalide salt of a viologen (1,1'-disubstituted 4,4'-bipyridinium dihalide) have been found to be particularly suitable.

The substituents on the bipyridinium molecule may be selected from alkyl or aryl groups. The alkyl groups may be substituted or unsubstituted C1 to C4 alkyl groups. The alkyl groups may be straight or branched chains. Substituents for the alkyl groups may be selected from a wide range of substituents including halogen, phenyl and substituted phenyl. Examples of preferred alkyl groups include methyl, ethyl, propyl, butyl and phenylmethyl (benzyl). The aryl groups may be substituted or unsubstituted aryl or heteroaryl.

Viologen salts may be provided as free compounds, shown below as 1, or in the form of polymers, shown below as II, where:

R and R' are independently chosen from alkyl or aryl groups as indicated above;

$R^2$ is an alkylene group, preferably a $C_2$ to $C_4$ alkylene group;

$X^-$ is an anion, preferably a halide ion; and n is an integer greater than or equal to 2.

Particularly preferred viologens include ethyl viologen dichloride, benzyl viologen dichloride and poly(butyl viologen dibromide).

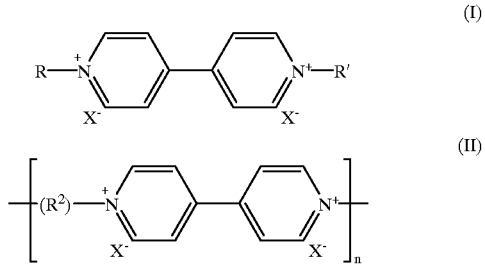

In a preferred aspect of the present invention the polymeric material may be directly treated with a viologen to render it electrically conductive.

Accordingly, in a preferred aspect of the present invention there is provided a method of preparing an electrically conductive polymeric article, which method includes providing a polymeric material capable of exhibiting electrical conductivity; and a viologen;

contacting a surface of the polymeric material with the viologen for a time sufficient to permit the polymeric material to be rendered electrically conductive.

Although not wishing to be bound by theory it is believed that when the polymeric material is treated with a viologen salt that the polymeric material undergoes oxidative doping and the halide anions are incorporated into the polymer. Surprisingly the method may be conducted at or above room temperature in the presence of air and preferably utilising an aqueous solution of the viologen salt. Thus the use of protonic acids or organic solvents may be avoided.

The rate of the reaction is dependent on the ease of the reduction of the viologen, e.g. a viologen dication, and the transfer of the anions to the polymeric material to form a doped and conductive form of the polymeric material.

Pursuant to the present invention, the reactions may be carried out by contacting the surface of the polymeric material with an aqueous solution of viologen salt. The reactions may continue for a time sufficient to permit a substantial degree of oxidative doping of the polymeric material to be achieved.

The viologen salt may be selected from any suitable materials as discussed above. A viologen dihalide is preferred.

The method of contacting the surfaces of the polymeric material with the viologen may vary widely, depending on the state of the polymeric material and the method selected for the reactions. One simple and preferred method involves immersing the polymeric material in an aqueous solution of the viologen salt, preferably a viologen dihalide, more preferably in excess, with proper agitation. The preferred concentration of the solution is between 0.01 M and 0.5 M.

The method may be conducted at any suitable temperature, e.g. at a temperature between 0° and approximately 100° C. The method may be conducted in the presence of air and under ordinary room lighting.

The method may be carried out for a period of time which is dependent on the form of the polymeric material (coating, thick film or powder), type of viologen salt and concentration. For example, for a thin PANi coating and a monomeric viologen dichloride at a concentration of 0.1 M, the reaction is rapid and the film turns conductive within 5 mins. For thick PANi films, and using a similar viologen type and concentration, the period of the experiment is extended to 1 day to ensure completion.

After completion of the reaction, the polymeric material may, for example, be blotted dry between filter paper to remove the unreacted viologen salt. The change of the PANi from the insulating base state (brown and blue for emeraldine freestanding film and coating, respectively) to the conductive state (blue and green for freestanding film and coating, respectively) is visually apparent, and may be confirmed by sheet resistance (Rs) measurement, X-ray photoelectron spectroscopy or UV-visible absorption spectroscopy.

EXAMPLES

The following specific examples are provided to illustrate this invention and the manner in which it may be carried out. It will be understood, however, that the specific details given in each example have been selected for the purpose of illustration, and are not to be construed as being limitations on the scope of the invention.

Example 1

Polyaniline (in the emeraldine or 50% oxidation state) was synthesized via the oxidative polymerization of aniline using ammonium persulfate in 0.5 M $H_2SO_4$ (A. G. MacDiarmid et al. *Synth. Met.* 18, 285 (1987)). The polyaniline powder was undoped using excess 0.5 M NaOH and the polyaniline (emeraldine) base powder was dissolved in N-methyl pyrrolidinone (NMP). Freestanding film of 10–20 μm was cast from the polyaniline base (8% wt) in NMP solution. This film was immersed in a 0.24 M solution of benzyl viologen dichloride

Figure 1:
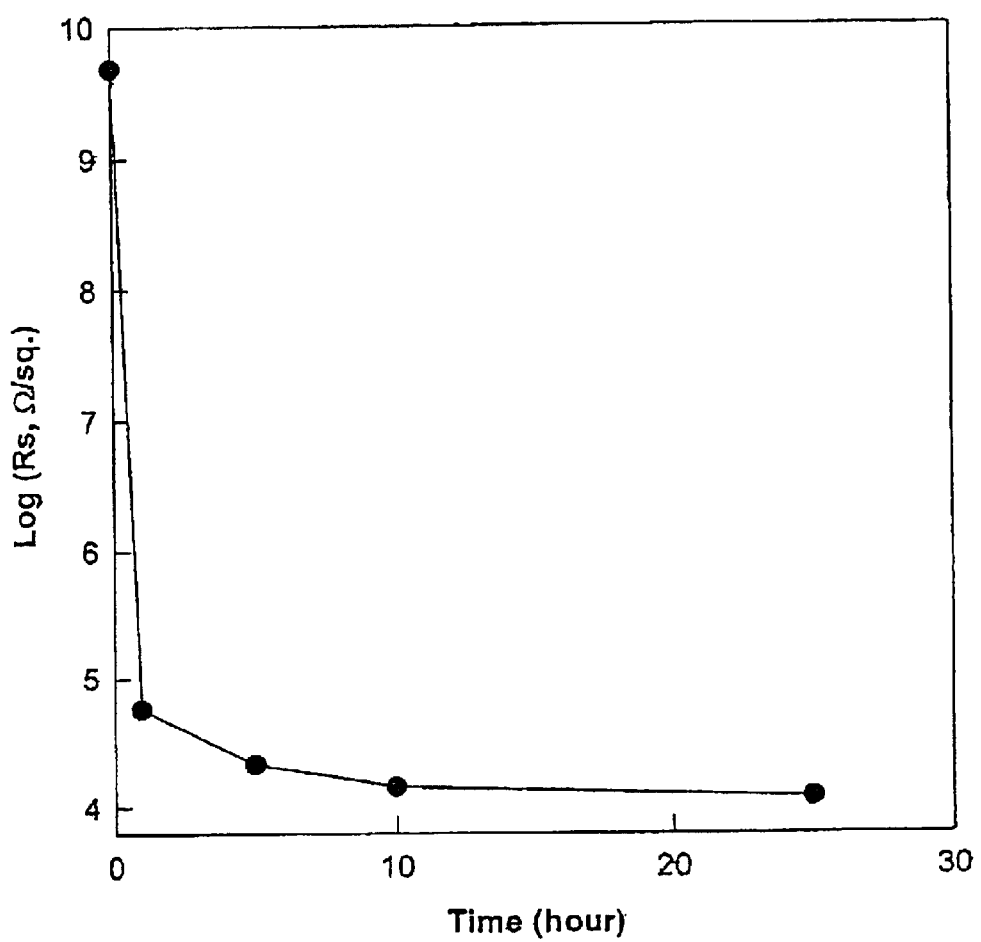
FIG. 1 shows the sheet resistance (Rs in Ω/sq.) versus time of emeraldine base free standing film treated in 0.24 M benzylviologen dichloride.

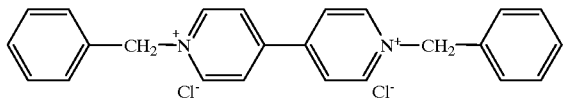

in water. The pH of the solution was between 5 and 6 and the experiment was carried out at 25° C. in an open test tube. A sharp decrease in Rs was observed within the first hour. The change in Rs with time of treatment is shown in FIG. 1.

The doping level as given by the $N^+/N$ ratio obtained is 0.4 after 24 h.

Example 2

A coating of polyaniline (in the emeraldine state) on low density polyethylene (LDPE) substrate was prepared by immersing a $O_2$ plasma pretreated LDPE film into a reaction mixture containing 0.10 M aniline and 0.025 M ammonium persulfate in 0.5 M $H_2SO_4$ for 2 h. The green polyaniline coated LDPE film was undoped in 0.5 M NaOH for 2 h and then washed with deionized water and pumped dry under reduced pressure. The base film was immersed in a 0.024 M poly(butylviologen dibromide)

Figure 2:
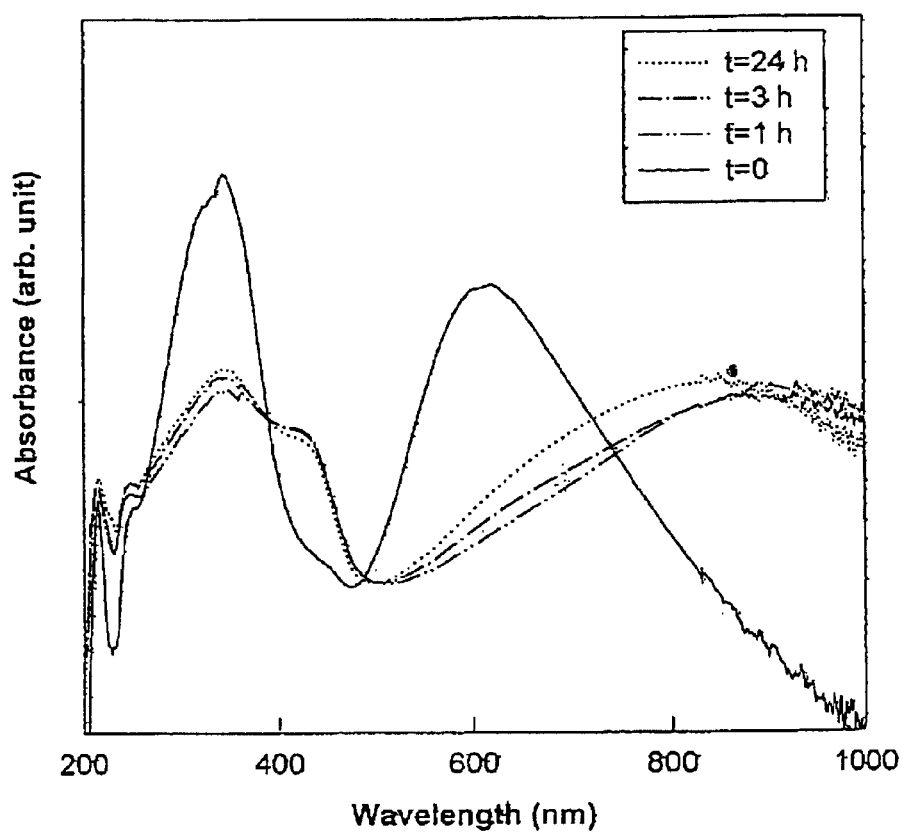
FIG. 2 shows UV-visible absorption spectra of PANi coating on LDPE film treated in 0.024 M polybutylviologen dibromide.

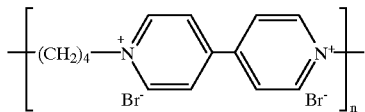

solution in water under ordinary room lighting. The change in the UV-visible absorption spectrum from that of emeraldine base to a conductive salt is illustrated in FIG. 2.

Example 3

Polyaniline freestanding (emeraldine) base film was synthesized as described in Example 1. Leucoemeraldine was prepared by treating the emeraldine base film with 10% hydrazine for 48 h. After treatment of the leucoemeraldine film (pale brown) with 0.12 M benzyl viologen dichloride at 25° C. and under ordinary room lighting for 24 h, the film has turned blue and Rs decreased from $10^{10}$ to $6\times10^5$ Ω/sq.

Example 4

Polyaniline freestanding (emeraldine) base film was synthesized as described in Example 1. Treatment of the film with 0.12 M benzyl viologen dichloride at 5° C. was carried out for 24 h under ordinary room lighting. The Rs obtained was $3\times10^5$ Ω/sq.

Example 5

Polyaniline freestanding (emeraldine) base film was synthesized as described in Example 1. Treatment of the film with 0.12 M benzyl viologen dichloride at 25° C. was carried out for 24 h in the absence of light. The Rs obtained was $4\times10^5$ Ω/sq.

Example 6

Polypyrrole (PPY) freestanding film was electrochemically synthesized in a one-compartment cell with 0.1 M pyrrole, 0.1 M p-toluenesulfonic acid in acetonitrile containing 1% V/V water. The film was grown with a charge density of 10 Coulomb $cm^{-2}$ at 0–5° C (X. Zhang, E. T. Kang, K. G. Neoh, K. L. Tan, D. Y. Kim and C. Y. Kim, *J. Appl. Polym. Sci.* 60, 1996, 625). The PPY film was then undoped by treatment in 0.5M NaOH for 24 h. This dried PPY film was immersed in 0.24 M aqueous solution of benzyl viologen dichloride for 24 h at 25° C. under ordinary room lighting. The film turned dark blue and Rs decreased from $10^7$ to $10^4$ o/sq.

Finally, it is to be understood that various alterations, modifications and/or additions may be made without departing from the spirit of the present invention as outlined herein.

What is claimed is:

1. An electrically conductive polymeric article comprising a polymeric material;
   the polymeric material being rendered intrinsically electrically conductive by treatment with a viologen salt.
2. An electrically conductive polymeric article according to claim 1 wherein the polymeric material is chosen from polymers derived from aromatic bases and from polymers derived from heterocyclic bases.
3. An electrically conductive polymeric article according to claim 2 wherein the polymeric material is chosen from polyaniline and its derivatives.
4. An electrically conductive polymeric article according to claim 2 wherein the polymeric material is chosen from polypyrrole and polypyrrole derivatives.
5. An electrically conductive polymeric article according to claim 3 wherein the polymeric material is polyaniline.
6. An electrically conductive polymeric article according to claim 4 wherein the polymeric material is polypyrrole.
7. An electrically conductive polymeric article according to claim 5, wherein the polymeric material is polyaniline or a polyaniline derivative having an oxidation state between the leucoemeraldine (0% oxidation state) and the emeraldine (50% oxidation state).
8. An electrically conductive polymeric article according to claim 1, wherein the polymeric material is in the form of a film, film coating, or powder.
9. An electrically conductive polymeric article according to claim 1, wherein the viologen salt is a viologen dihalide.
10. An electrically conductive polymeric article according to claim 9 wherein in the viologen dihalide the substituents on the bipyridinium are chosen from substituted and unsubstituted alkyl and aryl groups.
11. An electrically conductive polymeric article according to claim 10 wherein the substituted and unsubstituted alkyl groups are chosen from C1 to C4 alkyl optionally substituted with halogen, aryl or substituted aryl.
12. An electrically conductive polymeric article according to claim 11 wherein the substituted and unsubstituted alkyl groups are chosen from C1 to C4 alkyl and benzyl.
13. An electrically conductive polymeric article according to claim 9 wherein in the viologen dihalide the halide anions are chosen from chloride, bromide and iodide.
14. An electrically conductive polymeric article according to claim 1, wherein the viologen salt is present in a monomeric or polymeric form.
15. An electrically conductive polymeric article according to claim 5, wherein the resistance of the polyaniline or polyaniline derivative, Rs, is reduced from approximately $10^{10}$ Ω/sq to approximately $10^6$ Ω/sq or less.
16. An electrically conductive polymeric article comprising a polymeric material;
   the polymeric material being rendered intrinsically electrically conductive by treatment with a viologen dihalide salt, wherein the haloviologen material is selected from one or more of benzyl viologen dichloride and poly(butylviologen dibromide).
17. A method of preparing an electrically conductive polymeric article, which method comprises
   providing
      a polymeric material; and
      a viologen salt;
   contacting a surface of the polymeric material with the viologen salt to render the polymeric material intrinsically electrically conductive.
18. A method according to claim 17, wherein the polymeric material is polyaniline or a polyaniline derivative which has an oxidation state between the leucoemeraldine (0% oxidation) and the emeraldine (50% oxidation) states.
19. A method according to claim 17 wherein the polymeric material is a polypyrrole.
20. A method according to claim 17, wherein the viologen salt is selected from one or more of viologen benzyl dichloride and poly(butylviologen dibromide).

21. A method according to claim 17, wherein the viologen salt is present in the form of an aqueous solution.

22. A method according to claim 21, wherein the method is conducted at a temperature of 0° to approximately 100° C. in the presence of air.

23. A method according to claim 17, wherein the rate of conversion of the polymeric material to a conducting state is varied by varying one or more of the viologen salt, the concentration of the viologen salt, the concentration of oxygen present during the contacting step, the temperature at which the contacting step is performed and exposure of the contacted polymeric material to light.

24. An electrically conductive polymeric article prepared according to the method according to claim 17.

25. The method of claim 17, further comprising removing any unreacted viologen salt.

26. A method of preparing an electrically conductive polymeric article, which method comprises
   providing
      a polymeric material; and
      a viologen dihalide salt;
   contacting a surface of the polymeric material with the viologen salt to render the polymeric material intrinsically electrically conductive.

27. The method of claim 26, further comprising removing any unreacted viologen dihalide salt.

* * * * *